United States Patent Office 3,682,601
Patented Aug. 8, 1972

3,682,601
EVAPORATION OF BRINE CRYSTALLIZING
SODIUM CHLORIDE WITH FATTY ACID
ADDITIVE
Joseph P. Fedosoff, Dollard des Ormeaux, Quebec, and
John R. Trebish, Amherst, Nova Scotia, Canada, assignors to Domtar Limited, Montreal, Quebec, Canada
No Drawing. Filed July 31, 1970, Ser. No. 60,106
Int. Cl. B01g 17/00; C01d 1/30
U.S. Cl. 23—300                                           5 Claims

ABSTRACT OF THE DISCLOSURE

Evaporation of a sodium chloride brine solution containing calcium sulphate as an impurity is carried out at a temperature below 175° F. in the presence of a higher fatty acid, such as oleic acid. The sodium chloride crystals obtained in such evaporation have a very much reduced included calcium sulphate content, and the formation of calcium sulphate scale on the walls of the equipment is substantially reduced.

---

This invention relates to the evaporation of aqueous salt solutions. It relates particularly to the preparation of high purity salt from sodium chloride brines and more particularly to an improved method for producing crystalline sodium chloride having an unusually low calcium sulphate content.

Crystallization of sodium chloride from brine by evaporation of a saturated brine solution is a well known and long established industrial process. In existing processes crystallization is generally carried out in multiple effect vacuum pans to which the brine, suitably pretreated, if desired, is fed on a continuous basis and in which it is subjected to evaporation under controlled conditions of temperature and pressure. Heat for the evaporation is usually provided by steam. Live steam is fed to the first effect which generally operates at a pressure close to atmospheric; the vapour produced by the evaporation in the first effect serves as steam input to the second effect, and so on. This means, of course, that the second effect will operate under a lower temperature than the first and to maintain it at boiling point it is necessary to maintain in it a correspondingly lower pressure. A still lower temperature and correspondingly lower pressure will prevail in the third effect, and so on. As evaporation proceeds, salt crystallizes out and settles to the bottom of each pan and is removed continuously or at suitable intervals therefrom together with a portion of the brine. A portion of the brine is also withdrawn ("bled") from time to time from the upper part of the pan at a point where the brine tends to become enriched in impurities (such as chlorides of calcium, magnesium or potassium).

A common objectionable impurity in the crystalline salt obtained by evaporation of brine is calcium sulphate which crystallizes out from the brine along with the sodium chloride. Calcium sulphate is present in normally available brines in varying amounts, depending on the origin of the natural salt, and it crystallizes out of the brine in the form of the dihydrate, hemihydrate or anhydrite, as the case may be, depending on the temperature of evaporation. It is present as an impurity in the sodium chloride produced by the evaporation, both as an inclusion within the sodium chloride crystals, and as an external admixture with these crystals. The latter is in large part removable by washing but the included crystals of calcium sulphate cannot be removed by any such simple method. Yet, to attain the purity required nowadays in certain grades of commercial sodium chloride methods must be devised to remove the internal included impurities and not only the external ones.

Various attempts have been made heretofore to reduce the content of included calcium sulphate in the crystalline product and these attempts fall broadly into two categories. According to some proposals the brine is specially prepared to reduce the calcium sulphate content in the brine itself, e.g. by adding to the aqueous solvent (or to the "well-water" when the brine is prepared underground as is the case in solution mining) a compound or a mixture of compounds acting to inhibit the solubility of calcium sulphate. In this way a purer brine is obtained and less calcium sulphate crystallizes out with the salt as internal or external impurity; however, the production process is thereby rendered more complex and more costly, and the tendency toward build-up of calcium sulphate scale on the walls of the equipment, such as the heat exchanger, etc. may be increased. In other proposals, an attempt is made to increase the solubility of the calcium sulphate in the brine by means of additives which tend to modify the crystalline structure of calcium sulphate or otherwise affect the solubility so that crystallization of calcium sulphate is avoided in one or more of the effects by keeping the brine undersaturated with respect to calcium sulphate. Thus it has been proposed to add proteinaceous gelatinous material and, more recently, starch phosphate to the brine during evaporation in a vacuum pan evaporation unit, such addition having the effect of enhancing the supersaturation of the brine in respect of calcium sulphate and thus delaying its crystallization. However, supersaturation is essentially an unstable state entailing risks of sudden precipitation, and the use of this method generally requires preliminary treatment of the brine to remove substantially all bicarbonate. All this again limits the effectiveness or the economics of the proposal.

The present invention provides a method of producing high purity salt from brines containing calcium sulphate wherein the sodium chloride crystals obtained by evaporation of such brine have an unusually low included calcium sulphate content, and the calcium sulphate crystallizes out of the solution in a form and in conditions which make it easily separable from the sodium chloride crystals. Furthermore, the invention provides a method of evaporating brine wherein scaling of tubes and other surfaces is substantially reduced or completely eliminated.

In accordance with the present invention, crystalline sodium chloride and steam are produced from a brine by the evaporation of said brine at a temperature below about 175° F. in the presence of an effective amount of a higher fatty acid. More particularly, a method is provided wherein a sodium chloride brine containing calcium sulphate as an impurity is fed continuously into an evaporator pan, the brine is evaporated in the presence of an additive consisting of a higher fatty acid having a chain length of 12–20 carbons, solid sodium chloride is removed with a portion of the brine from said evaporator pan, and a flocculent material containing calcium sulphate crystals and the fatty acid additive is separately removed from the brine in said evaporator pan.

Brines suitable for use in this invention include the ordinary brines obtained, e.g. by dissolving mined "rock" salt in water, or by dissolving in an underground cavity the natural salt deposit and pumping the brine up to the surface as is practiced in so-called solution mining. If desired, the brines may be pre-treated in any convenient way, either to remove impurities or for other reasons. In modern installations the brine is generally fed continuously from a feed tank to the evaporator pans in which the evaporation takes place. As previously indicated, the first evaporator pan is usually heated by addition of live steam and the temperature of the boiling brine will be, e.g. about 200° F. or somewhat higher; to maintain the brine at boiling point a somewhat reduced pressure has to be maintained in the pan corresponding to the vapour pressure of the brine solution at the given temperature. The normal crystalline form of calcium sulphate at these temperatures is the anhydrite. The next evaporator pan is heated with the steam generated by the evaporation in the first pan and the temperature in the second pan is lower, and is, e.g. of the order of 155–175° F.; in the third pan the temperature will be still lower, e.g. 120–140° F. The equilibrium form of calcium sulphate at these lower temperatures is generally the dihydrate.

It will be evident that multiple effect evaporators having, e.g. four or five effects can equally be used, each of said effects being heated with the steam generated in the next preceding effect and accordingly operating at a temperature lower than in the said preceding effect and under a corresponding pressure. The process of this invention can be used in any of these effects operating at a temperature below about 175° F. and is preferably used in effects operating at a temperature below about 155° F.

The additive of this invention is a higher fatty acid, i.e. an aliphatic monocarboxylic acid, saturated or unsaturated, having a chain length of 12–20 carbon atoms. It is preferred to use an acid which is easily commercially available and we have found oleic, stearic, palmitic, myristic, margaric, and linoleic acids particularly useful. Mixtures of acids also are effective. In the production of salt for use in foods and the like, care will be taken to use an acid of the so-called food grade, i.e. approved by the respective health or food authorities—even though no trace of the additive is normally found in the final product after it has been washed and dried.

The fatty acid additive can be added to the pan in any convenient manner, continuously or intermittently, care being taken to maintain in the pan an adequate concentration of the additive. The quantity of the additive required will vary within relatively wide limits depending on the amount of calcium sulphate impurity, on the particular acid used, and on other circumstances. Even with quantities of oleic acid as low as 2 p.p.m. in terms of volume, a reduction occurs in the included calcium sulphate content, but generally a minimum, e.g. of about 5–10 p.p.m. is desirable. The effective minimum can be easily determined in each case by a simple analysis of the final product; as long as increasing the quantity of the additive contributes to a further reduction of calcium sulphate in the salt such increased concentration is desirable. However, there will be no advantage in going beyond a certain optimum quantity. The optimum can vary within wide limits and will generally be chosen by common sense on the basis of effectiveness, economics, etc. Generally, a few simple tests of the pan liquor will help to determine the right limit of the quantity of additive. Once an effective level of the additive, at or above the required minimum, has been established, the pan liquor is tested from time to time for changes in the additive level: if the normally feeble concentration of the additive in the pan liquor keeps increasing, the proportion of additives may be considered unnecessarily high and the dosage may be reduced; if the concentration remains substantially constant, the dosage may be continued unchanged. Thus by trial and error the best amount can be determined for a given operation.

During the evaporation in the presence of the additive, a loose flocculent material is formed which consists of small calcium sulphate crystals held in an organic medium, the main constituent of which is the fatty acid additive. Practically all of the additive added finds its way into this light floc, and only a very small concentration of the additive is detected in the liquid. The floc is easily separable from the pan liquid. The formation of the floc is not fully understood, but it seems to play an important role in the working of the process. A tentative explanation of the mechanism is as follows: Calcium ions are present in the brine in excess of sulphate ions, hence at any given time during the growth of a calcium sulphate crystal there will be more calcium than sulphate ions in the crystal lattice and the crystal will have a small overall positive charge. The carboxylic group of the fatty acid additive, on the ohter hand, will have a small negative charge and there will be a tendency for the carboxylic group of the acid molecule to attach itself to the calcium sulphate crystal, with the hydrophobic hydrocarbon chain of the acid molecule forming a sort of protective covering against other crystals in the system. This hydrophobic shield prevents the small calcium sulphate crystal from acting as a seed crystal for sodium chloride and hence from becoming embedded in the sodium chloride lattice. It will be understood that this explanation, while plausible, does not fully explain the phenomena occurring and that, in any case, the present invention is not predicated on any particular theory explaining these phenomena.

The formation of the floc offers a very convenient way of removing both the calcium sulphate crystals formed during the evaporation as well as of the fatty acid additive that has completed its role in the process. As already stated, in continuous operation only very small quantities of the fatty acid are found in the pan liquid and substantially none is found with the solid salt after it has been withdrawn from the pan, washed, filtered and dried.

Since crystalline calcium sulphate tends to accumulate in the loose flocculent material formed during evaporation there is less tendency for calcium sulphate deposition to take place on the metal surfaces of the walls, tubes, etc. of the evaporation equipment. Thus the use of the additive of this invention during evaporation has the additional, unexpected and beneficial effect of reducing or preventing the formation of the hard or scaly deposits generally formed during evaporation by the deposition of calcium sulphate (and calcium carbonate) on the inner surfaces of the evaporation equipment. It has been found that even scale previously formed on the surfaces of the equipment during conventional operation has been in large part removed when evaporation was subsequently carried out in the same equipment using the additive of this invention. It will be appreciated that this advantage is obtained just as fully when the principal product sought of the evaporation is not crystalline salt but, e.g. salt-free water, as is the case, e.g. in evaporation operations aiming at the desalinization of salt water or the like. As already indicated, where the product collected is crystalline sodium chloride, the salt crystals obtained by the process of this invention have a much reduced included calcium sulphate content, namely generally less than about 0.03% and in most cases considerably less than 0.01%. Furthermore, the crystal size of the salt obtained by the process of this invention is substantially greater than in conventional processes.

The following examples will further illustrate the practice of this invention but it will be understood that the invention is not limited to the particular embodiments disclosed.

EXAMPLE I

In this example a comparison is made between evaporation of brine in the presence of a higher fatty acid additive and evaporation without such additive.

The evaporation was carried out in two identical 1500 ml. filtration flasks connected to a common vacuum source. Each flask was placed on a stirring hot plate which served as a source of heat and also provided agitation by means of a magnetic stirrer. Each flask was stoppered with a rubber stopper through which the leg of a separatory funnel was made to protrude inside the flask as a means of feeding brine. Each flask was fitted with a thermometer.

Each of the flasks was charged with 1000 mls. of a pan brine. In one of the flasks was placed a measured quantity of the additive; no additive was placed in the second flask which served as control. The additive in this case was oleic acid. No addition of additive was made during the test. The vacuum and temperature were set to be the same in each flask. After the brine in the flasks began to boil, feeding of additional brine into the flasks was started. The feed brine was added dropwise from the separatory funnel until the total amount of feed brine added was 1000 mls. The initial brine was a filtered brine taken from an evaporator pan in a salt evaporation plant and the feed brine was a filtered feed brine taken from the same plant. The temperature and pressure were set respectively at 110° F. and 26" Hg vacuum. The concentration of oleic acid in the brine was about 100 p.p.m.

When all the feed had been used, the evaporation was stopped and the samples were filtered. The salt was washed in saturated NaCl solution to remove any external $CaSO_4$ and then the salt was analyzed to determine the amount of internal $CaSO_4$ in the salt. The size of the salt was determined by microscopic methods. The internal $CaSO_4$ content of salt was 0.010% in the test sample and 0.060% in the control sample. The evaporation was repeated in exactly the same conditions except that the temperature and pressure were, respectively, 170° F. and 18" Hg vacuum and the concentration of oleic acid in the brine was 50 p.p.m. The washed salt had an internal $CaSO_4$ content of 0.020% in the test sample and 0.035% in the control sample. The average particle size of the produced salt was 184μ in the test sample and 152μ in the control sample.

EXAMPLE II

Evaporation was carried out in accordance with the set-up and the conditions of Example I, except that stearic acid was used as additive. The temperature and pressure were, respectively, 110° F. and 26" Hg vacuum. The concentration of stearic acid in the brine was 110 p.p.m. The salt, after washing in a saturated NaCl solution, showed an analysis of 0.038% $CaSO_4$ in the test sample and 0.060% in the control sample.

The evaporation was repeated in exactly the same conditions except that the temperature and pressure were respectively, 170° F. and 18" Hg vacuum, and the concentration of stearic acid in the brine was 50 p.p.m. The washed salt had an internal $CaSO_4$ content of 0.025% in the test sample and 0.035% in the control sample. The average particle size of the produced salt was 246μ in the test sample and 152μ in the control sample.

EXAMPLE III

Evaporation was carried out exactly as in Example I, except that linoleic acid was used as additive. With temperature and pressure, respectively 110° F. and 26" Hg vacuum and a concentration of linoleic acid in the brine of 100 p.p.m., the resulting salt had an internal $CaSO_4$ content of 0.016% in the test sample and 0.060% in the control sample.

With temperature and pressure respectively at 170° F. and 18" Hg vacuum, and a concentration of linoleic acid in the brine of 25 p.p.m., the resulting salt had an internal $CaSO_4$ content of 0.015% in the test sample and 0.035% in the control sample. The average particle size of the produced salt was 204μ in the test sample and 152μ in the control sample.

EXAMPLE IV

Oleic acid was added to the Number Three evaporator pan of the triple effect system of a commercially operating salt plant. This pan operates continuously at about 110° F. and about 2" Hg absolute pressure and produces gypsum as the calcium sulphate impurity. The salt from this pan usually contains from 0.08 to 0.12% internal calcium sulphate.

An initial charge of oleic acid corresponding to 100 p.p.m. oleic acid, based on volume of the brine in the evaporator, was added upon commencement of boiling; thereafter, for the duration of the test oleic acid was added every one-half hour in an amount of about 0.01% of the amount of brine fed to the evaporator.

After start-up, the internal $CaSO_4$ in the produced salt rose at first and then dropped until after about 16 hours of operation the internal $CaSO_4$ in the salt was below 0.002% and hence undetectable by the analytical methods used. A microscopic examination confirmed that internally the produced salt was substantially $CaSO_4$-free. This substantially $CaSO_4$-free salt was produced for thirty-six hours until the pan was shut down for boil-out.

During the course of the test, a loose floc was noticed to form in the evaporator. This floc held most of the gypsum in the pan and once it had built up to about 10% of the volume of a bleed-brine sample no free gypsum crystals were observed in the evaporator. The pan was bled to maintain the floc between 10 and 20 percent. The build-up of the floc to 10% was accompanied by the disappearance of substantially all internal gypsum in the salt. During the early stages of the test free oleic acid was noticed in the evaporator, but again, as soon as the floc built up to 10% no free oleic acid was noticed.

No operating problems were encountered and, upon shut down, no difficulties were observed during boil-out.

EXAMPLE V

On a different occasion from that in Example IV, oleic acid was added to the Number Three evaporator of the triple effect system of a commercially operating salt plant.

The initial charge of oleic acid was such as to create a concentration of 50 p.p.m. oleic acid based on the volume of brine in the evaporator and further additions of oleic acid and brine were made in the ratio of 50 parts oleic acid to 1,000,000 parts of feed brine. After about twelve hours the produced salt became essentially free of internal $CaSO_4$ and remained substantially $CaSO_4$-free to the end of the test. The floc build-up was held between 10 and 20%.

After 36 hours, the rate of oleic acid addition was dropped to 25 p.p.m. The internal $CaSO_4$ remained negligible and the floc was still evident. Twenty-four hours later the rate of oleic acid addition was further lowered to 15 p.p.m.; the level of internal $CaSO_4$ still remained negligible. The original amount of calcium sulphate scaling was noticeably reduced.

When the rate of addition was dropped to 10 p.p.m. the following day, the floc started to break up and internal $CaSO_4$ became noticeable in the salt, building up to 0.023%. Thereupon the rate of oleic addition was raised to 20 p.p.m. and within one hour the floc reappeared and the $CaSO_4$ internal content again became negligible. The test was then concluded. During the course of this test a record of the size of the salt crystals produced was kept. The average size was 360μ which is considerably higher than the usual 250–300μ salt produced in this pan. The original calcium sulphate scale was completely removed.

We claim:

1. The method of crystallizing sodium chloride out of a saturated brine solution containing calcium sulphate as an impurity, comprising: introducing a brine solution into an evaporation vessel, introducing into said brine solution a straight-chain higher fatty acid of a chain length between 12 and 20 carbon atoms in in amount of at least 5 p.p.m. based on the weight of the brine, evaporating said brine solution at a temperature below 175° F. under partial vacuum in the presence of said higher fatty acid thereby to precipitate in said brine crystals of sodium chloride, recovering sodium chloride crystals of a reduced included calcium sulphate content from said brine.

2. A process according to claim 1 wherein said brine is evaporated at a temperature below about 155° F.

3. A process according to claim 1 wherein said fatty acid is one of the group consisting of oleic, stearic, palmitic, myristic, margaric and linoleic acids.

4. A process according to claim 1 wherein said fatty acid is oleic acid.

5. A process according to claim 2 wherein said fatty acid is oleic acid.

References Cited

UNITED STATES PATENTS

| | | | |
|---|---|---|---|
| 2,222,330 | 11/1940 | Weinig | 23—312 |
| 2,293,111 | 8/1942 | Campbell | 23—312 |
| 2,642,335 | 6/1953 | Ewart | 23—303 |
| 2,964,467 | 12/1960 | Lambert | 23—312 |
| 3,155,458 | 11/1964 | Fieldman | 23—89 |
| 3,241,929 | 3/1966 | Jordan | 23—312 |
| 3,305,491 | 2/1967 | Oster | 23—89 |
| 3,353,927 | 11/1967 | Ralston | 23—42 |

NORMAN YUDKOFF, Primary Examiner

S. SILVERBERG, Assistant Examiner

U.S. Cl. X.R.

23—89, 303